UNITED STATES PATENT OFFICE.

GEORGE MITCHELL, OF NACO, ARIZONA TERRITORY.

METHOD OF CONVERTING COPPER MATTE INTO METALLIC COPPER.

SPECIFICATION forming part of Letters Patent No. 719,488, dated February 3, 1903.

Application filed September 16, 1902. Serial No. 123,645. (No specimens.)

*To all whom it may concern:*

Be it known that I, GEORGE MITCHELL, of Naco, in the county of Cochise and Territory of Arizona, have invented certain new and useful Improvements in Methods of Converting Copper Matte into Metallic Copper; and I do hereby declare the following to be a full, clear, and exact description of the invention, such as will enable others skilled in the art to which it appertains to make and use the same.

My invention relates to an improved method of converting copper matte into metallic copper.

The following is the method now resorted to for converting copper matte into metallic copper:

A converter provided with horizontal twyers located above its bottom is provided with a lining, which when first applied is from eighteen to twenty-four inches in thickness. The lining is composed of quartz as pure as can be obtained and containing from ninety-eight to ninety-nine per cent. silica, which is ground and mixed with clay, the latter serving as a binder to retain the lining in place. Copper matte containing from forty-five to fifty per cent. copper is charged in a molten condition into the converter, and the air-blast on being applied is forced through the twyers and into and through the molten matte, with the result that the iron and sulfur contained in the matte are oxidized and serve to maintain the charge at a high temperature, causing the iron to attack the silica lining and convert the iron into silicate of iron or slag, which being lighter than copper floats on the surface of the matte or practically converted charge. After the charge has been blown from fifteen to twenty minutes practically all of the iron contained therein will have been transformed into slag and then the converter is turned down and the slag raked off. After the slag has been removed the converter is tilted back to its upright position and the blowing operation continued until all the impurities have been eliminated and the charge converted into metallic copper.

During the process of conversion the contact of the molten copper or copper matte with the silica lining of the converter and with the jets of air forced into the charge operates to so chill the copper, which is of low specific heat, as to cause it to freeze over the inner ends of the twyers, and unless removed such chilled copper will so obstruct the twyers and supply of air to the charge as to not only delay the process, but prevent its successful accomplishment. Hence provision is made for punching the twyers from time to time during the blowing of a charge and removing any chilled copper that may have frozen over the inner ends of the twyers, and thereby maintain a continuous supply of air to the molten charge.

The most objectionable and expensive feature of the process above described consists in supplying the molten matte with silica from the converter-lining, because the rapid destruction of the lining by the ferrous oxid resulting from the oxidation of the matte necessitates the renewal of the lining after from eight to twelve blows. The relining of a converter involves an outlay of considerable time, labor, and expense and necessitates the employment of a number of extra converter-bodies for each converter-stand in order that while one converter is being used others may be supplied with new linings and sufficient time be afforded to dry the linings, so as to render the converters fit for use. The linings not only require the employment of expensive machinery and a large amount of time and labor for their application, but are further objectionable in that when freshly applied they materially reduce the capacity of the converter, and also because they absorb a large amount of heat from the molten charge, and thereby prolong the time and increase the work of conversion. Further, it has been found commercially impracticable to convert copper matte of a grade containing less than from forty to fifty per cent. copper, owing to the rapid destruction of the converter-linings, due to the greater percentage of impurities which must be converted into slag.

Attempts have been made to dispense with the thick silica linings and supply the required amount of silica to the molten charge by feeding silica into the molten matte through the mouth of the converter and by forcing finely ground or powdered silica through the twyers and into the charge; but all such attempts proved unsuccessful. A large portion of the cold silica thus fed into the molten matte rose to the surface, when it aggregated in infusible lumps that floated about without dissolving in slag to any appreciable extent. When sand or powdered silica was used, it was forced out of the twyers when opened for punching and injured the workmen. The cold silica fed into the converter also appreciably cooled the molten charge and prolonged the time and increased the work of conversion.

Having described the method now practiced for converting copper matte and the unsuccessful attempts that have been resorted to for obviating the necessity for the frequent renewal of the linings, I will now describe my improved method of operation and set forth its several advantages.

The converter, which may be of any of the desired forms and constructions of copper-converters now in use, may be provided with a silica lining of sufficient thickness only to protect the metallic shell or body of the converter against the destructive action of the heat of the molten charge, although I preferably provide it with a basic or acid lining the sole function of which is to protect the shell of the converter. After the molten charge of matte has been poured into the converter pure or practically pure silica, previously heated in a heating-furnace until it is nearly or quite white hot, is fed in proper quantities through the mouth of the converter or through the twyers directly into the charge of molten matte. The highly-heated silica not only maintains the heat of the molten matte, but owing to its high temperature it is readily and quickly attacked by the ferrous oxid resulting from the oxidation of the matte and forms therewith a slag which is removed in the usual manner. After the converter has been turned down and the slag removed it is tilted back and the blowing is continued until the charge is converted into metallic copper.

My improved process insures a long life to a comparatively thin converter-lining and enables approximately equal amounts of matte to be converted at each operation. It obviates the necessity for supplying a large number of extra converter bodies or bowls for each converter-stand; it very largely reduces the time, labor, and expense for renewing the linings; it materially reduces the labor and expense incurred in punching the twyers during the blowing of a charge, and, further, it makes it practical to convert lower-grade mattes than has been commercially practicable by the method of operation now in use.

Having fully described my invention, what I claim as new, and desire to secure by Letters Patent, is—

1. The method of converting copper matte into metallic copper, which consists in feeding pure or practically pure silica in a molten condition into the molten matte during the operation of blowing, substantially as set forth.

2. The method of converting copper matte into metallic copper, which consists in charging molten matte into an acid or basic lined converter and feeding pure or practically pure silica in a molten condition into the molten matte while it is being blown to metallic copper, substantially as set forth.

In testimony whereof I have signed this specification in the presence of two subscribing witnesses.

GEORGE MITCHELL.

Witnesses:
FRANK J. NICHOLS,
R. W. DARBY.